United States Patent
Gupta et al.

(10) Patent No.: US 12,086,111 B2
(45) Date of Patent: Sep. 10, 2024

(54) FILE TRANSFER PRIORITIZATION DURING REPLICATION

(71) Applicant: Dell Products, L.P., Round Rock, TX (US)

(72) Inventors: Kaushik Gupta, Pune (IN); Shiv S. Kumar, Pune (IN); Jai P. Gahlot, Pune (IN)

(73) Assignee: DELL PRODUCTS L.P., Round Rock, TX (US)

(*) Notice: Subject to any disclaimer, the term of this patent is extended or adjusted under 35 U.S.C. 154(b) by 235 days.

(21) Appl. No.: 17/538,486

(22) Filed: Nov. 30, 2021

(65) Prior Publication Data
US 2023/0169046 A1    Jun. 1, 2023

(51) Int. Cl.
*G06F 16/182* (2019.01)
*G06F 16/17* (2019.01)

(52) U.S. Cl.
CPC ...... *G06F 16/1844* (2019.01); *G06F 16/1734* (2019.01)

(58) Field of Classification Search
CPC .. G06F 16/1844; G06F 16/1734; G06F 3/061; G06F 3/065; G06F 3/067; H04L 67/1095
USPC ........................................................ 707/634
See application file for complete search history.

(56) References Cited

U.S. PATENT DOCUMENTS

| | | | |
|---|---|---|---|
| 7,617,217 B1 | 11/2009 | Chen et al. | |
| 7,818,299 B1 | 10/2010 | Federwisch et al. | |
| 7,991,791 B1 | 8/2011 | Chen et al. | |
| 8,069,149 B1 | 11/2011 | Chen et al. | |
| 10,983,873 B1* | 4/2021 | Blackard | G06F 11/1461 |
| 11,086,726 B2* | 8/2021 | Kumar | G06F 11/1458 |
| 11,258,688 B2 | 2/2022 | Gell et al. | |
| 2007/0185852 A1 | 8/2007 | Erofeev | |
| 2013/0124464 A1 | 5/2013 | Rank et al. | |
| 2019/0034453 A1 | 1/2019 | Jarvis et al. | |
| 2019/0260658 A1 | 8/2019 | Gell et al. | |
| 2020/0349074 A1 | 11/2020 | Kucherov et al. | |
| 2021/0152624 A1* | 5/2021 | Vaykole | H04L 67/141 |
| 2021/0181945 A1* | 6/2021 | Kumar | G06F 11/3466 |
| 2021/0326358 A1 | 10/2021 | Seelemann, II et al. | |
| 2022/0129152 A1 | 4/2022 | Adams et al. | |

OTHER PUBLICATIONS

Notice of Allowance mailed Feb. 23, 2023 for U.S. Appl. No. 17/538,445, 54 pages.

(Continued)

*Primary Examiner* — Michael Pham
(74) *Attorney, Agent, or Firm* — Amin, Turocy & Watson, LLP

(57) ABSTRACT

A system can determine to perform a replication of data from first computing equipment to second computing equipment, the data being stored as part of a path in a file system. The system can determine that a change log of file operations on files in the path identifies a file operation on a file that is made by a user account that has priority for replications. The system can replicate the file. The system can, after processing the change log for file operations made by first user accounts that have priority for replications, replicating other files in the path associated with second user accounts that do not have priority for replications.

20 Claims, 11 Drawing Sheets

(56) References Cited

OTHER PUBLICATIONS

Gupta et al. "File Transfer Prioritization During Replication" U.S. Appl. No. 17/538,340, filed Nov. 30, 2021, 43 pages.
Gupta et al. "File Transfer Prioritization During Replication" U.S. Appl. No. 17/538,445, filed Nov. 30, 2021, 48 pages.
Office Action mailed Dec. 21, 2023 for U.S. Appl. No. 17/538,340, 49 pages.
Notice of Allowance mailed May 13, 2024 for U.S. Appl. No. 17/538,340, 97 pages.

* cited by examiner

600

```
JDOE      READ     /USR/JDOE/SENSITIVE/DIR1/FILEA
JDOE      WRITE    /USR/JDOE/SENSITIVE/DIR2/FILEC
ASMITH    READ     /USR/JDOE/SENSITIVE/DIR1/FILEA
JDOE      READ     /USR/JDOE/SPECIAL/DIR4/FILEG
```

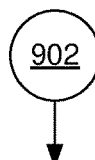

↓

DETERMINING THAT A CHANGE LOG OF FILE OPERATIONS ON FILES IN A PATH FOR A REPLICATION IDENTIFIES A FILE OPERATION ON A FILE THAT IS MADE BY A USER ACCOUNT THAT HAS PRIORITY FOR REPLICATIONS 904

REPLICATING THE FILE 906

AFTER PROCESSING THE CHANGE LOG FOR FILE OPERATIONS, COMPRISING THE FILE OPERATION, MADE BY USER ACCOUNTS, COMPRISING THE USER ACCOUNT, THAT HAVE PRIORITY FOR REPLICATIONS, REPLICATING OTHER FILES IN THE PATH APPLICABLE TO OTHER USERS ACCOUNTS THAT LACK PRIORITY FOR REPLICATIONS 908

FIG. 9

FILE TRANSFER PRIORITIZATION DURING REPLICATION

BACKGROUND

Data replication can comprise a form of data protection where data from a source computer is duplicated to a destination computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine to perform a replication of data from first computing equipment to second computing equipment, the data being stored as part of a path in a file system. The system can determine that a change log of file operations on files in the path identifies a file operation on a file that is made by a user account that has priority for replications. The system can replicate the file. The system can, after processing the change log for file operations made by first user accounts that have priority for replications, replicating other files in the path associated with second user accounts that do not have priority for replications.

An example method can comprise determining, by a system comprising a processor, that a change log of file operations on files in a path for a replication identifies a file operation on a file that is made by a user account that has priority for replications. The method can further comprise replicating, by the system, the file. The method can further comprise, after processing the change log for file operations, comprising the file operation, made by user accounts, comprising the user account, that have priority for replications, replicating, by the system, other files in the path applicable to other users accounts that lack priority for replications.

An example non-transitory computer-readable medium can comprise instructions that, in response to execution, cause a system comprising a processor to perform operations. These operations can comprise determining that a change log of file operations on files in a path for a replication identifies first files accessed by a user account that has priority for replications. These operations can further comprise replicating the first files. These operations can further comprise, after replicating the first files, replicating second files in the path, wherein the second files omit files from the first files.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example system architecture of a change log can facilitate file transfer prioritization during replication, in accordance with an embodiment of this disclosure;

FIG. 9 illustrates another example process flow that can facilitate file transfer prioritization during replication, in accordance with an embodiment of this disclosure;

DETAILED DESCRIPTION

Overview

Figure 1:
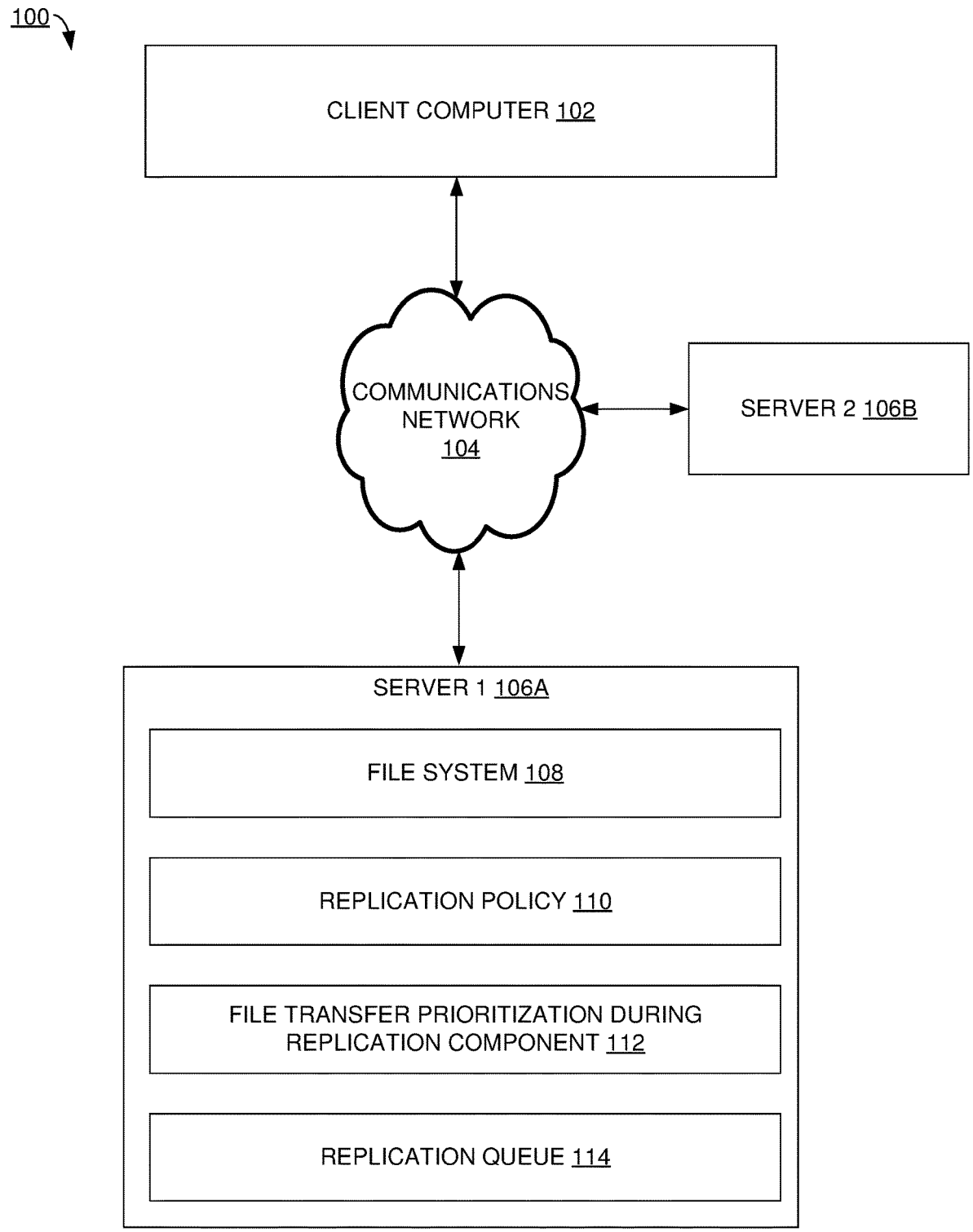
FIG. 1 illustrates an example system architecture that can facilitate file transfer prioritization during replication, in accordance with an embodiment of this disclosure.

Storage, such as network attached storage (NAS), can provide a replication facility for disaster recovery. In some examples, a replication recurring job can be defined to protect data involved in one or more Recovery Point Objectives (RPOs) in a disaster recovery plan.

There can be multiple files to migrate in a replication job execution. Different users can edit these files between two subsequent job runs of one replication policy. The users that edit a file can change over time. Different users can be assigned different levels of criticality as far as meeting RPOs. Additionally, different applications with varied criticality can write files to these storage systems.

In some examples, a general queue of files can be maintained while transferring a file from a source to target storage. This queue can be populated as a replication job traverses through a directory structure under replication. Another thread can keep reading file information from the queue and start replication tasks.

In some prior approaches, while populating the queue, a file priority based on user criticality is not considered. This can mean that a file written by a critical user can be replicated to the target at the end of a replication job.

The examples described herein generally involve the use of queues (e.g., a priority queue and a normal queue). It can be appreciated that a queue can generally be implemented in a variety of ways, such as with a variety of data structures (e.g., a linked list data structure, or a circular buffer data structure). A queue can generally order elements such that those elements can be retrieved (or transferred) in that order.

In some examples, a list of files to transfer for replication can be maintained, along with a respective priority for each file. Files can be accessed from the list by querying a component that maintains the list for, e.g., a file with a highest priority among those files presently in the list. In other examples, the querying entity can specify a priority being requested, and that entity can request files with the highest priority until no more are present, then files with the next highest priority until no more are present, etc.

In some examples, a queue does not strictly order the files being replicated. Rather, the queue can order files based on their priority, and within a particular priority (e.g., high priority), files are not ordered. That is, it can be that higher priority files are transferred before lower priority files, but that there is not a specific order of transferring files within a specific priority level.

There can be scenarios where a partial replication (e.g., a few files are replicated out of identified files for replication) can be implemented. For example, this can be implemented in a home directory workflow, where an administrator wants to replicate home directory files across different users.

There can be a possibility that during a replication job, a source storage system can be hit by a disaster, and only a few of the identified files for replication will be successfully transferred to the target storage system. In this situation, where a priority of files is not maintained during replication, then it can be that more critical files can have less protection.

The present techniques can be implemented to maintain a priority of files during replication based on a criticality of an associated user or application.

Prioritizing a user can be implemented as follows. In some examples, a change-log can be generated based on a priority of the user. In such examples, file operations from a priority user can be logged in a change log file (sometimes referred to as a changelog). When a copy-job runs, the copy-job can first refer to the change log for priority users, and copy those files that are mentioned in the change log. Once done, the change log can be truncated, or used for other purposes.

With regard to populating a file change log, a filter driver can be utilized. In some examples, a filter driver can be implemented for each protocol driver. A filter can driver can split information such as username, file operation, and file path for each priority user to a file change daemon. Based on username, a file change daemon can update the user's change log.

Some replications can be performed on a snapshot with metadata about the snapshot (e.g., creation and expiry time, expiry action, subsets, state, etc.). Additional information about a replication can involve when to create a dataset (e.g., a creation policy that accepts a schedule and a source account ID), when to replicate the dataset and the source and destination (e.g., a copy policy that accepts a schedule and source and target account IDs), and identifying source and target computers (e.g., account details that accept a Uniform Resource Identifier (URI) or Internet Protocol (IP) address for accessing each computer). This information can be stored in a key-value store (KVS).

A scheduler can keep track of a current time and when to execute a next replication policy. When it is time for a policy to run, a job corresponding to the policy can be created.

In examples that implement replication on a computing cluster that comprises a plurality of nodes, replication can be implemented as follows. One node can serve as a scheduler. Where the node serving as the scheduler goes down, other nodes can race to become the scheduler. Each node on a cluster can have a job-runner. A job created by the scheduler can be picked up by any job-runner, which can create a first task for the job (which can be referred to as a root-task), and monitor the job until the job comes to an end.

Each node on a cluster can have a task-runner, and tasks for any job can be picked up by any task-runner.

Tasks can be created on a KVS (with indexing, which can be referred to as a key-value index (KVI)). This indexing can help a task-runner to fetch tasks based on state and priority. A task-runner can query for tasks with pending state and high priority. If there are no high priority tasks, the task-runner can then query for tasks with pending state and medium priority (and then pending state and low priority).

Every node on the cluster has a task-runner. The tasks for any job could be picked by any task-runner.

In some prior approaches, the priority for every task for one job is the same as the priority of the job.

The present techniques can be implemented to better prioritize tasks. Using the high/medium/low priority framework, a new priority—highest—can be implemented. In such examples, even if a job has a high priority (meaning that its tasks also have a high priority), there can be highest priority tasks that are prioritized above high priority tasks.

Priority files can be identified as part of a change log. In such examples, a root-task can first read the change log and create file-transfer-tasks for those identified files. Then, the root-task can create file-transfer-tasks for other portions of the replication path.

Once the root-task creates highest priority tasks for each file entry mentioned in a change log, a hash-table containing names of all the priority files and/or sub-directories can be generated.

Once the priority tasks are processed, a tree walk can be performed for transferring non-priority files. Before creating a task, the hash-table can be referred. If the file name or sub-directory is present in the hash-table, it can be that the task for that file/sub-directory is not created as it has already been processed in the current instance of replication.

Example Architectures

FIG. 1 illustrates an example system architecture 100 that can facilitate file transfer prioritization during replication, in accordance with an embodiment of this disclosure.

System architecture 100 comprises client computer 102, communications network 104, server 1 106A, and server 2 106B. In turn, server 1 106A comprises file system 108, replication policy 110, file transfer prioritization during replication component 112, and replication queue 114.

Client computer 102 can access files stored in file system 108, via communications network 104. As the data in file system 108 is modified, it can be periodically replicated to server 2 106B to provide data protection. Replication can be managed by file transfer prioritization during replication component 112, which can follow the replication parameters defined by replication policy 110, and use replication queue 114 as a queue of files to be transferred in a current instance of a replication.

File transfer prioritization during replication component 112 can first access a change log (which can be similar to system architecture 700 of FIG. 7) for high priority files to replicate and add those files to replication queue 114. File transfer prioritization during replication component 112 can then navigate a replication path of file system 108 that is defined by replication policy 110 to identify other files to replicate, and add those identified files to replication queue 114.

Replication policy 110 can store information about a replication, such as a protected path, a priority of the replication policy, a frequency with which to perform the replication, a source system (e.g., server 1 106A) and a destination system (e.g., server 2 106B). File system 108 can be similar to system architecture 700 of FIG. 7.

Replication queue 114 can comprise an ordered queue so that an order in which files to transfer are inserted indicates an order in which those files will be replicated during the current instance of replication. In other examples, replication queue 114 can comprise a data structure that keeps track of files to replicate and their associated priorities. A component that transfers files to the target computer can access replication queue 114 for a file that has a highest priority among files presently in replication queue 114, and in that manner, order a transfer of files according to their priority.

Figure 11:
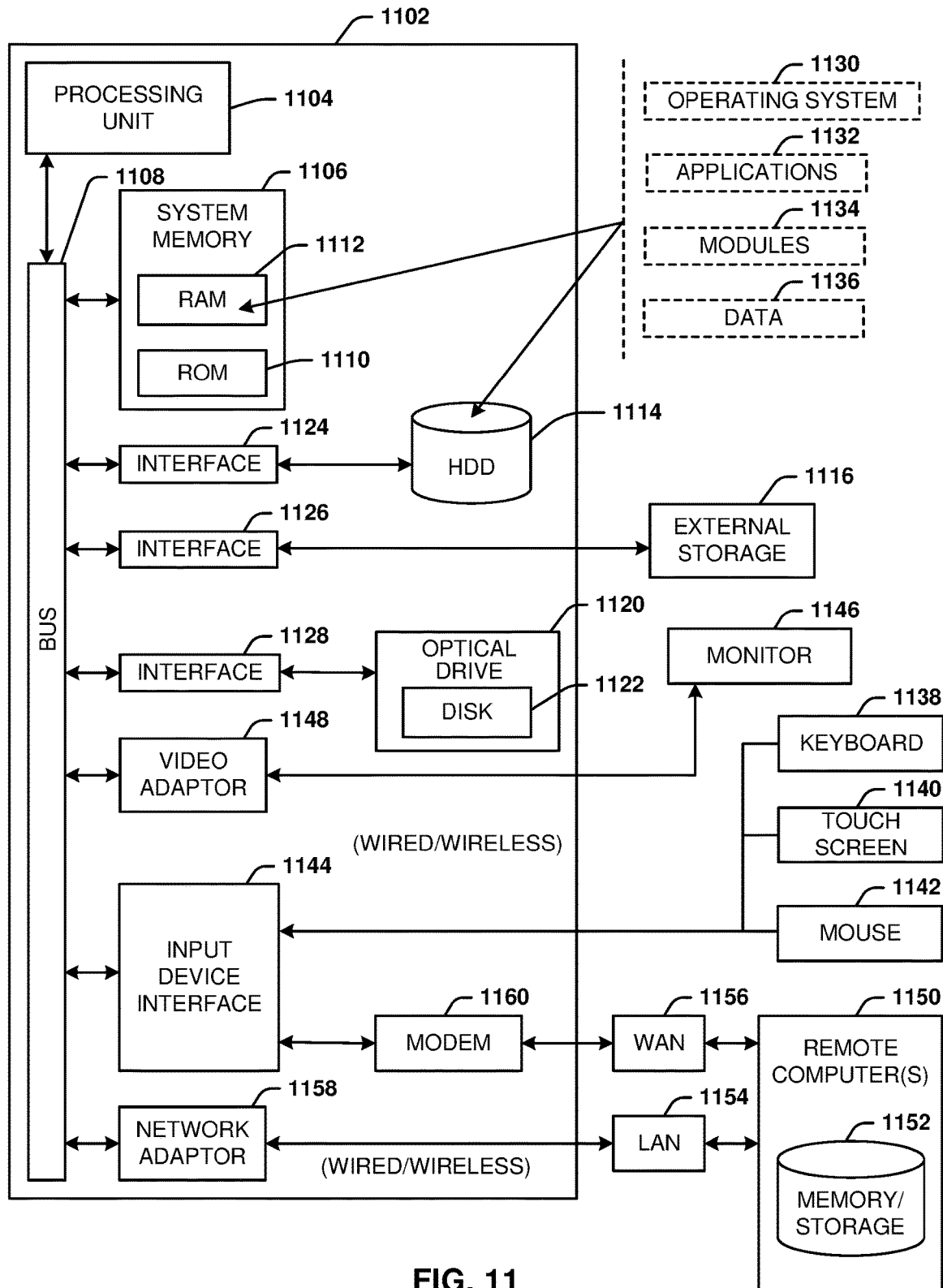
FIG. 11 illustrates an example block diagram of a computer operable to execute an embodiment of this disclosure.

Each of client computer 102, server 1 106A, and/or server 2 106B can be implemented with part(s) of computing environment 1100 of FIG. 11. Communications network 104 can comprise a computer communications network, such as the INTERNET.

Figure 8:
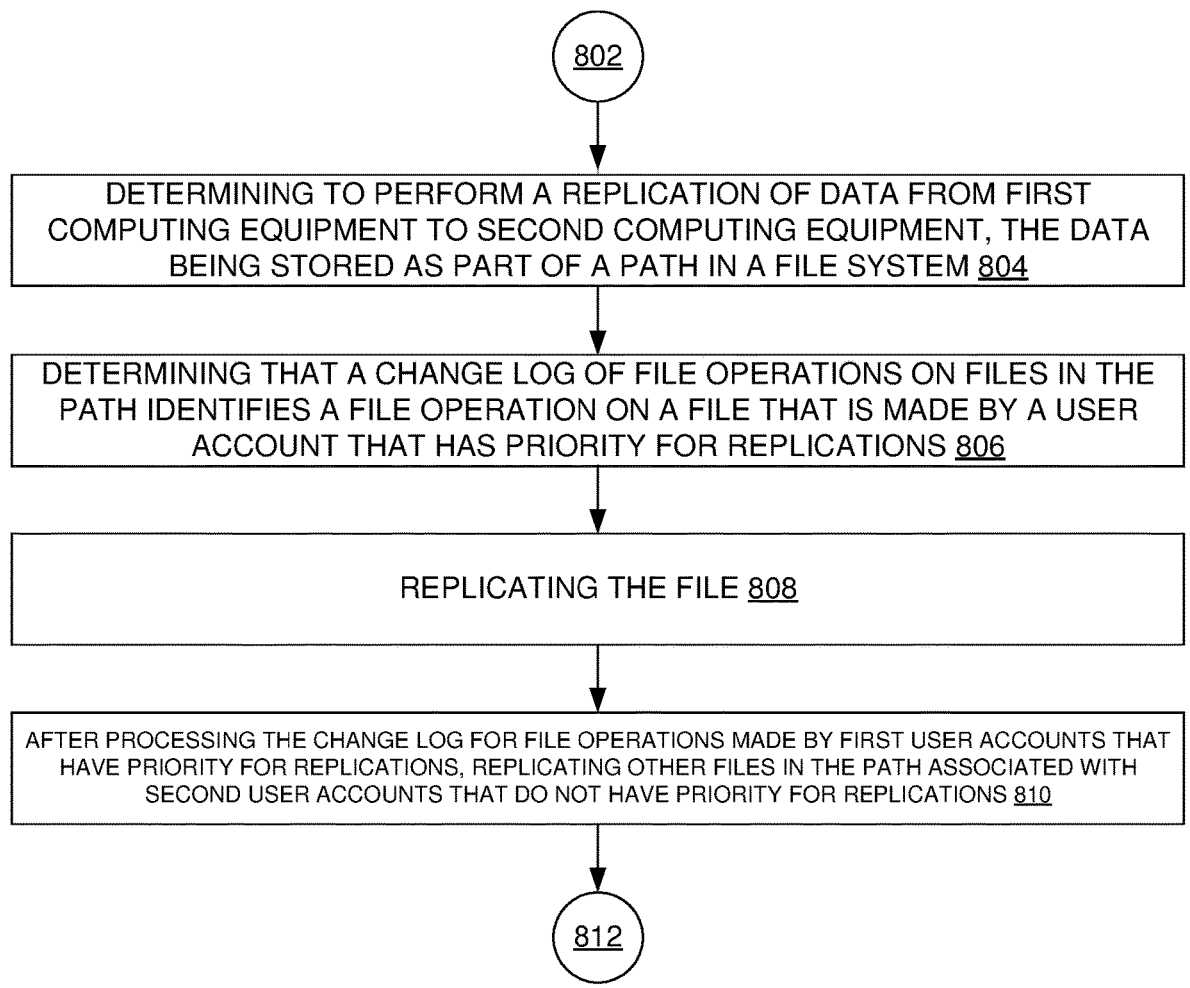
FIG. 8 illustrates an example process flow that can facilitate file transfer prioritization during replication, in accordance with an embodiment of this disclosure.
Figure 10:
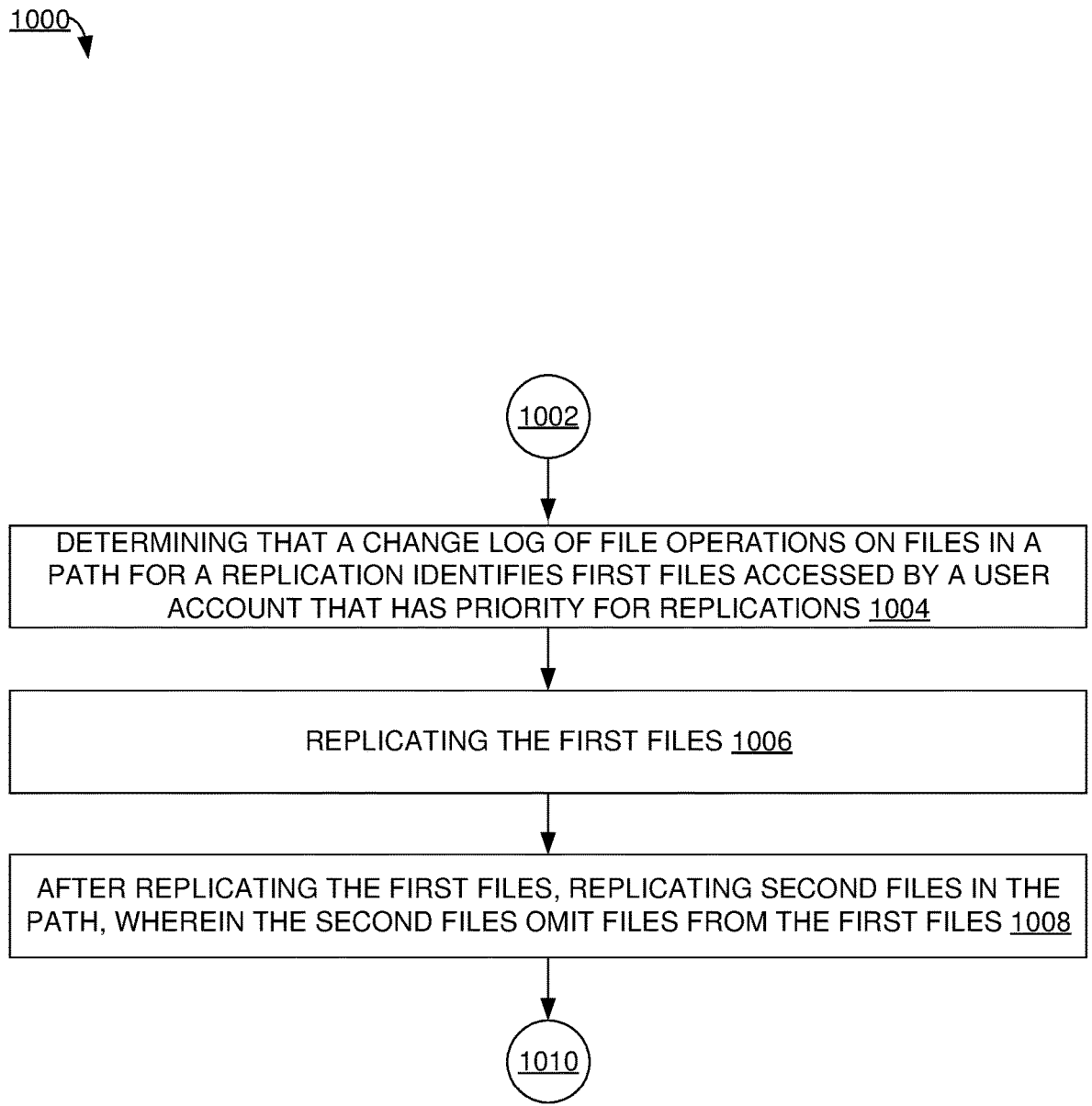
FIG. 10 illustrates another example process flow that can facilitate file transfer prioritization during replication, in accordance with an embodiment of this disclosure.

In some examples, file transfer prioritization during replication component 112 can implement part(s) of the process flows of FIGS. 8-10 to facilitate file transfer prioritization during replication.

It can be appreciated that system architecture 100 is one example system architecture for file transfer prioritization during replication, and that there can be other system architectures that facilitate file transfer prioritization during replication.

Figure 2:
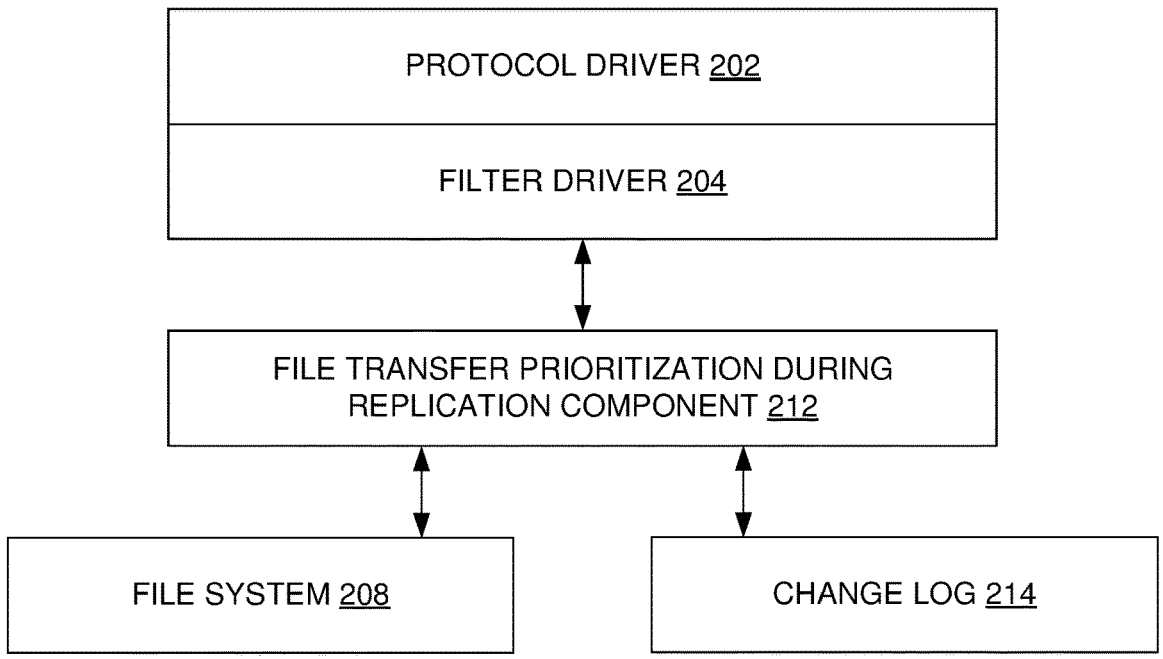
FIG. 2 illustrates an example system architecture of one protocol driver and one change log that can facilitate file transfer prioritization during replication, in accordance with an embodiment of this disclosure.

FIG. 2 illustrates an example system architecture 200 of one protocol driver and one change log that can facilitate file transfer prioritization during replication, in accordance with an embodiment of this disclosure. System architecture 200 comprises protocol driver 202, filter driver 204, file transfer prioritization during replication component 212 (which can be similar to file transfer prioritization during replication component 112 of FIG. 1), file system 208 (which can be similar to file system 108), and change log 214.

Protocol driver 202 can operate on server 1 106A of FIG. 1, and can comprise a file system driver that receives commands from client computer 102 according to a particular protocol (e.g., a server message block (SMB) protocol, or a network file system (NFS) protocol) and executes those commands on file system 208. A command can be, for example, to create a file, read a file, or write to a file.

Filter driver 204 can monitor file system operations executed by protocol driver 202. Filter driver 204 can maintain a list of priority users. When a priority user accesses a file, filter driver 204 can determine this from the monitored file system operations, and pass information about the operation to file transfer prioritization during replication component 212. In other examples, all operations identified by filter driver 204 can be sent to file transfer prioritization during replication component 212, which can determine whether they involve a priority user.

File transfer prioritization during replication component 212 can write information about file operations to change log 214. In some examples, file transfer prioritization during replication component 212 can filter on priority users, and write file system operations by priority users to change log 214, while omitting writing file operations by non-priority users. In the example of system architecture 200, one change log—change log 214—is used to store information about file operations that are logged for all users.

File transfer prioritization during replication component 212 can use information in change log 214 to facilitate file transfer prioritization during replication. File transfer prioritization during replication component 212 can first identify files in change log 214 and add them to replication queue 114 of FIG. 1. File transfer prioritization during replication component can then identify other files in a replication path identified by replication policy 110 and add those other files to replication queue 114.

File transfer prioritization during replication component 212 can avoid adding the same file twice to a replication queue in one instance of performing replication in various ways. For example, file transfer prioritization during replication component 212 can maintain a hash of file paths of files added to a replication queue during the current replication and check each newly identified file against the hashes. Where a hash match is identified, file transfer prioritization during replication component 212 can omit adding that file to the replication queue (since it has already been added). Where there is not a hash match, file transfer prioritization during replication component 212 can add the file to the replication queue (since it can be determined that the file has not already been added as part of the current replication).

While system architecture 200 comprises a protocol driver and a filter driver, it can be appreciated that there can be other examples that mark files for high priority replication due to being accessed by a priority user. For example, there can be system architectures where this function is performed by a protocol driver, without the intervention of a filter driver.

Figure 3:
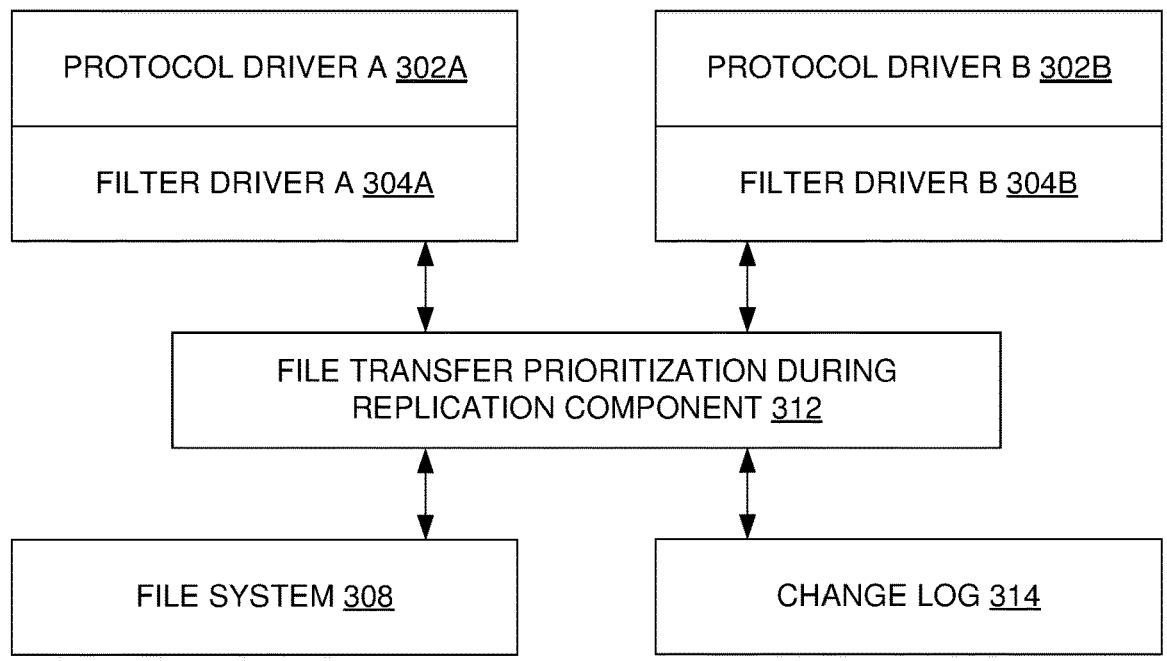
FIG. 3 illustrates an example system architecture of multiple protocol drivers and one change log that can facilitate file transfer prioritization during replication, in accordance with an embodiment of this disclosure.

FIG. 3 illustrates an example system architecture 300 of multiple protocol drivers and one change log that can facilitate file transfer prioritization during replication, in accordance with an embodiment of this disclosure.

System architecture 300 comprises protocol driver A 302A and protocol driver B 302B (which each can be similar to protocol driver 202 of FIG. 2), filter driver A 304A and filter driver 304B (which each can be similar to filter driver 204), file transfer prioritization during replication component 312 (which can be similar to file transfer prioritization during replication component 212), file system 308 (which can be similar to file system 208), and change log 314 (which can be similar to change log 214).

Protocol driver A 302A and protocol driver B 302B can each implement a different protocol. For example, protocol driver A 302A can implement a SMB protocol, and protocol driver B 302B can implement a NFS protocol. In this example, one client computer (e.g., client computer 102 of FIG. 1) can communicate (e.g., with server 1 106A) according to a SMB protocol that is processed by protocol driver A 302A, and another client computer communicates according to a NFS protocol that is processed by protocol driver B 302B.

In identifying file operations by priority users, a separate filter driver can be implemented for each protocol driver. Each of filter driver 304A and filter driver 304B can identify file operations by priority users, and log those file operations in the same change log—change log 314.

Figure 4:
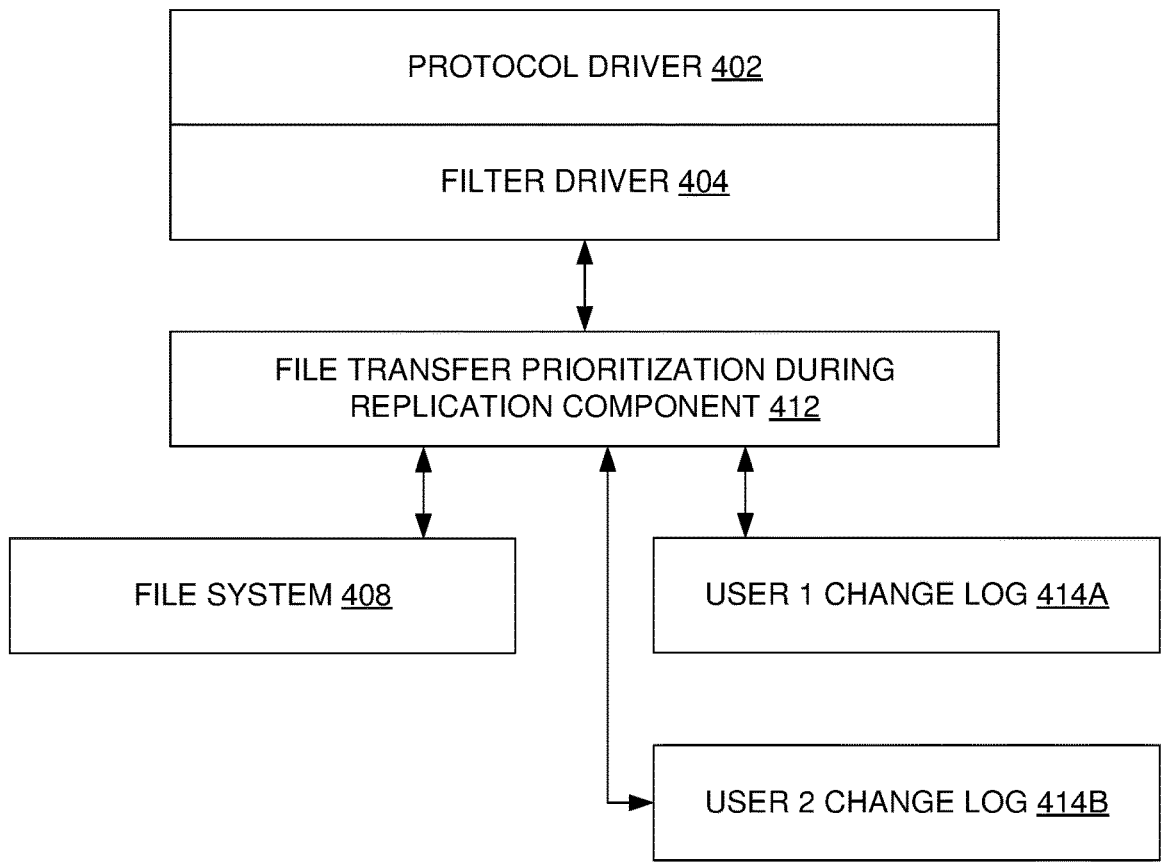
FIG. 4 illustrates an example system architecture of one protocol driver and multiple change logs that can facilitate file transfer prioritization during replication, in accordance with an embodiment of this disclosure.

FIG. 4 illustrates an example system architecture 400 of one protocol driver and multiple change logs that can facilitate file transfer prioritization during replication, in accordance with an embodiment of this disclosure.

System architecture 400 comprises protocol driver 402 (which can be similar to protocol driver 202 of FIG. 2), filter driver 404 (which can be similar to filter driver 204), file transfer prioritization during replication component 412 (which can be similar to file transfer prioritization during replication component 212), file system 408 (which can be similar to file system 208), and user 1 change log 414A and user 2 change log 414B (which each can be similar to change log 214).

File transfer prioritization during replication component 412 can receive information about file operations from filter driver 404, identify the corresponding user, and store information about the file operation in a corresponding change log. For example, where there are two users—user 1 and user 2—file transfer prioritization during replication component 412 can store information about file operations by user 1 in user 1 change log 414A, and can store information about file operations by user 2 in user 2 change log 414A.

In performing a replication, file transfer prioritization during replication component 412 can identify files in both user 1 change log 414A and user 2 change log 414B and add them to a replication queue (e.g., replication queue 114 of FIG. 1). File transfer prioritization during replication component 412 can then identify other files in a corresponding replication path and add those files to the replication queue for replication.

Figure 5:
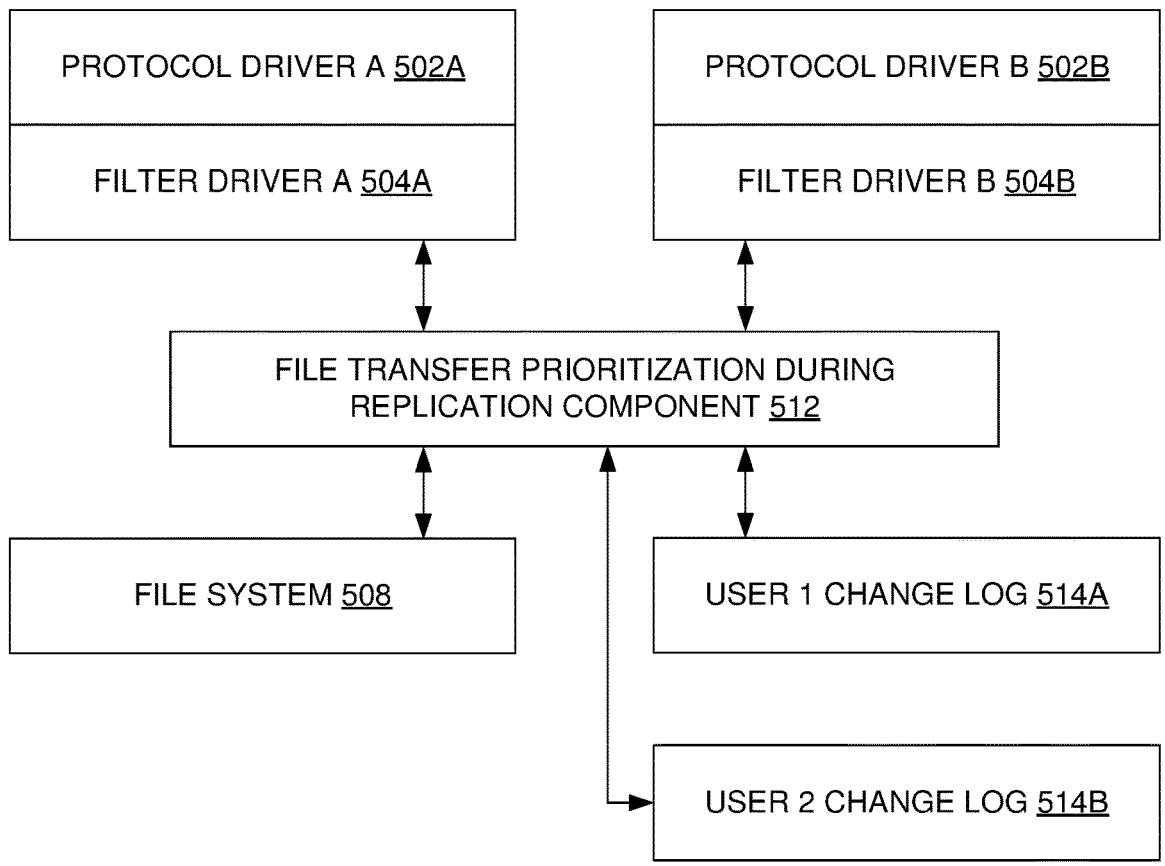
FIG. 5 illustrates an example system architecture of multiple protocol drivers and multiple change logs that can facilitate file transfer prioritization during replication, in accordance with an embodiment of this disclosure.

FIG. 5 illustrates an example system architecture 500 of multiple protocol drivers and multiple change logs that can facilitate file transfer prioritization during replication, in accordance with an embodiment of this disclosure.

System architecture 500 comprises protocol driver A 502A and protocol driver B 502B (which can be similar to protocol driver A 302A of FIG. 3 and protocol driver B 302B, respectively), filter driver A 504A and filter driver 504B (which can be similar to filter driver A 304A and filter driver 304B, respectively), file transfer prioritization during replication component 412 (which can be similar to file transfer prioritization during replication component 212 of FIG. 2), file system 408 (which can be similar to file system 208), and user 1 change log 514A and user 2 change log 514B (which each be similar to user 1 change log 414A of FIG. 4 and user 2 change log 414B, respectively).

In system architecture 500 (like in system architecture 400), change logs can be maintained per user. Where one user performs file operations with different protocols—utilizing each of protocol driver A 502A and protocol driver B 502B—those file operations can still be stored in one change log because it is the same user.

In performing a replication, file transfer prioritization during replication component 512 can identify files in both user 1 change log 514A and user 2 change log 514B and add them to a replication queue (e.g., replication queue 114 of FIG. 1). File transfer prioritization during replication component 512 can then identify other files in a corresponding replication path and add those files to the replication queue for replication.

FIG. 6 illustrates an example system architecture 600 of a change log can facilitate file transfer prioritization during replication, in accordance with an embodiment of this disclosure.

As depicted, system architecture 600 (which can be similar to change log 214 of FIG. 2) comprises information about four file operations, and for each file operation, identifies an associated user, a type of file operation (e.g., read or write), and a path to the file that was operated on.

In system architecture 600, these four file operations are "jdoe [user], read [type of file operation], /usr/jdoe/sensitive/dir1/fileA (path to the file that was operated on];" "jdoe, write, /usr/jdoe/sensitive/dir2/fileC;" "asmith, read, /usr/jdoe/sensitive/dir1/fileA;" and "jdoe; read; /usr/jdoe/special/dir4/fileG."

In performing a replication, file transfer prioritization during replication component 112 of FIG. 1 can identify files in system architecture 600, and add them to a replication queue (e.g., replication queue 114). File transfer prioritization during replication component 112 can then identify other files in a corresponding replication path and add those files to the replication queue for replication.

Figure 7:
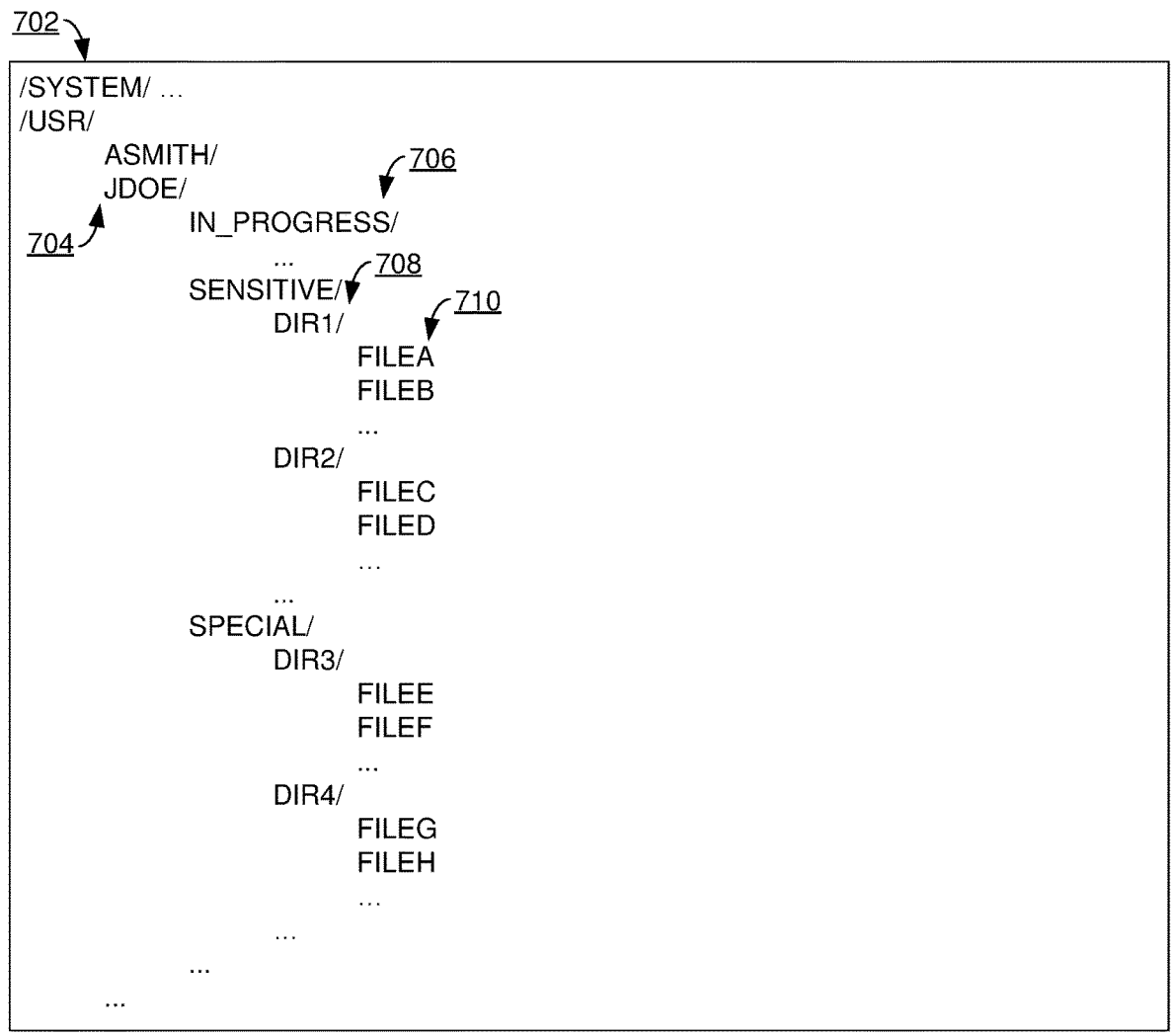
FIG. 7 illustrates an example system architecture for a file system that can facilitate file transfer prioritization during replication, in accordance with an embodiment of this disclosure.

FIG. 7 illustrates an example system architecture 700 for a file system that can facilitate file transfer prioritization during replication, in accordance with an embodiment of this disclosure. System architecture comprises file system 702 (which can be similar to file system 108 of FIG. 1), and file transfer prioritization during replication component 712 (which can be similar to file transfer prioritization during replication component 112).

File system 702 comprises a hierarchical file system of folders (e.g., /system/ and /usr/) and files (e.g., fileA and fileB). Layer 1 704 of file system 704 identifies specific user folders—/usr/asmith/ and /usr/jdoe/). Layer 2 706 is a sub-layer of layer 1 704, and illustrates folders contained within /usr/jdoe. Layer 3 708 is a sub-layer of layer 2 706, and illustrates folders contained within /usr/jdoe/sensitive. Layer 4 710 is a sub-layer of layer 3 708, and illustrates files contained within /usr/jdoe/sensitive/dir1.

Tree-walking file system 702 can comprise traversing file system 702, and navigating from layer 1 toward layer 4 for each layer for a particular replication path (e.g., navigating the folders and files within /usr/asmith, the folders and files within /usr/jdoe, etc.).

In some examples, in a tree walk, a root-task can perform a directory-level walk for a first directory in a path. For each file in the directory, a file-transfer-task can be created, and for each sub-directory, a dir-transfer-task can be created. File-transfer-tasks can transfer the files and end. Dir-transfer-tasks can perform a walk-through in the assigned sub-directory and create more file-transfer-tasks and dir-transfer-tasks. With this approach, dir-transfer-tasks can create more tasks until there are no more sub-directories to analyze.

Take an example file system where the root directory of a replication path contains, directory dir-home, directory dir-data, file file-a, and file file-b. A root task can first create two dir-transfer-tasks—one for dir-home ("T1") and one for dir-data ("T2"). The root task can also create two file-transfer-tasks—one for file-a and one for file-b.

Where dir-home contains directory dir-subdir, file file-x, and file file-y, T1 can create a dir-transfer-task for dir-subdir, and file-transfer-tasks for each of file-x and file-y. Where dir-data contains file file-p and file file-q, T2 can create file-transfer-tasks for file-p and file-q (and no dir-transfer-tasks because dir-data lacks a sub-directory).

Example Process Flows

FIG. 8 illustrates an example process flow 800 that can facilitate file transfer prioritization during replication, in accordance with an embodiment of this disclosure. In some examples, one or more embodiments of process flow 800 can be implemented by file transfer prioritization during replication component 112 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804. Operation 804 depicts determining to perform a replication of data from first computing equipment to second computing equipment, the data being stored as part of a path in a file system. This replication can be from server 1 106A of FIG. 1 to server 2 106B, and the data can be stored in file system 108.

After operation 804, process flow 800 moves to operation 806.

Operation 806 depicts determining that a change log of file operations on files in the path identifies a file operation on a file that is made by a user account that has priority for replications. This change log can comprise change log 214 of FIG. 2, change log 314 of FIG. 3, change log 414A and/or change log 414B of FIG. 4, or change log 514A and/or change log 514B of FIG. 5.

In some examples, the change log identifies the user account, the file operation, and a path of the file. That is, a change log can store information similar to that described with respect to system architecture 600 of FIG. 6.

In some examples, the file operation comprises reading the file, modifying the file, or creating the file.

In some examples, operation 806 comprises receiving user input data indicative of identifying the user account as having priority. That is, a user identity (e.g., an administrator account) can designate certain users as being priority users, and this information can be stored by file transfer prioritization during replication component 112 of FIG. 1 as part of facilitating file transfer prioritization during replication.

In some examples, operation 806 comprises, after processing the change log for the file operations made by the first user accounts that have priority for replications, truncating the change log. That is, entries in the change log that are processed as part of replication can then be removed from the change log. In this manner, a time constraint can be applied to priority replication. Priority replication can be performed for files that have been accessed by a priority user subsequent to the last replication.

In some examples, the user account is a first user account, the change log comprises a first change log and a second change log, the first change log stores information about first file operations made by the first user account, and the second change log stores information about second file operations made by a second user account. That is, per-user change logs can be implemented, similar to system architecture 400 of FIG. 4 comprising both user 1 change log 414A and user 2 change log 414B.

After operation 806, process flow 800 moves to operation 808.

Operation 808 depicts replicating the file. This can comprise replicating the file as it is listed in replication queue 114 of FIG. 1.

After operation 808, process flow 800 moves to operation 810.

Operation 810 depicts, after processing the change log for file operations made by first user accounts that have priority for replications, replicating other files in the path associated with second user accounts that do not have priority for replications. This can comprise identifying files in a replication path of file system 108 of FIG. 1 that are have not already been added to replication queue in the current instance of replication (because they were not listed in a change log of files that receive priority transfer.).

In some examples, operation 810 comprises, while traversing the path, adding first files in the path that are omitted from the change log to a replication queue, and refraining from adding second files in the path that are referenced in the change log to the replication queue. That is, files can be added to a replication queue once as part of an instance of replication. Where a file has been added to a replication queue because it is identified in a change log, if that file is later identified as part of traversing a replication path, it can be skipped over and not added to the replication queue a second time.

After operation 810, process flow 800 moves to 812, where process flow 800 ends.

FIG. 9 illustrates another example process flow 900 that can facilitate file transfer prioritization during replication, in accordance with an embodiment of this disclosure. In some examples, one or more embodiments of process flow 900 can be implemented by file transfer prioritization during replication component 112 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904. Operation 904 depicts determining that a change log of file operations on files in a path for a replication identifies a file operation on a file that is made by a user account that has priority for replications. In some examples, operation 904 can be implemented in a similar manner as operations 804-806 of FIG. 8.

In some examples, operation 904 comprises logging the first file operations made by the user accounts that have priority for replications in the change log, and refraining from logging second file operations made by the other user accounts that lack priority for replications in the change log. That is, it can be that file operations by non-priority users are not added to the change log (e.g., change log 214 of FIG. 2).

In some examples, operation 904 comprises monitoring, by a filter driver, for driver originated file operations made by a file system driver, wherein indications of the driver originated file operations are stored in the change log. That is a filter driver (e.g., filter driver 204 of FIG. 2) can capture file operations.

In some examples, operation 904 comprises receiving, by a file-change daemon, the indications of the driver originated file operations from the filter driver, and writing, by the file-change daemon, the indications of the driver originated file operations to the change log. That is, a file-change daemon (which can be part of file transfer prioritization during replication component 112 of FIG. 1) can receive this information from the filter driver, and store it in a change log.

In some examples, the filter driver is a first filter driver, the file system driver is a first file system driver, the driver originated file operations are first file operations, the indications are first indications, and operation 904 comprises monitoring, by a second filter driver, second file operations made by a second file system driver, wherein second indications of the second file operations are stored in the change log, and wherein the first file system driver and the second file system driver process respective file operations according to different protocols. That is, there can be examples that implement multiple filter drivers, such as with filter driver 304A and filter driver 304B of FIG. 3.

In some examples, operation 904 comprises receiving, by a file-change daemon, the first indications of the first file operations from the first filter driver and the second indications of the second file operations from the second filter driver, and writing, by the file-change daemon, the first indications of the first file operations to the change log, and the second indications of the second file operations to the change log. That is, in examples where there are multiple filter drivers, there can still be one file-change daemon (e.g., part of file transfer prioritization during replication component 112 of FIG. 1) that interfaces with both filter drivers.

In some examples, the user account is a first user account, the change log comprises a first change log and a second change log, the first change log stores information about first file operations made by the first user account, and the second change log stores information about second file operations made by a second user account. That is, per-user change logs can be implemented, similar to user 1 change log 414A and user 2 change log 414B of FIG. 4.

After operation 904, process flow 900 moves to operation 906.

Operation 906 depicts replicating the file. In some examples, operation 906 can be implemented in a similar manner as operation 808 of FIG. 8.

After operation 906, process flow 900 moves to operation 908.

Operation 908 depicts, after processing the change log for file operations, comprising the file operation, made by user accounts, comprising the user account, that have priority for replications, replicating other files in the path applicable to other users accounts that lack priority for replications. In some examples, operation 908 can be implemented in a similar manner as operation 810 of FIG. 8.

After operation 908, process flow 900 moves to 910, where process flow 900 ends.

FIG. 10 illustrates another example process flow 1000 that can facilitate file transfer prioritization during replication, in accordance with an embodiment of this disclosure. In some examples, one or more embodiments of process flow 1000 can be implemented by file transfer prioritization during replication component 112 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004. In some examples, operation 1004 comprises logging a first group of file operations, comprising the file operations, made by user accounts, comprising the user account, that have priority for replications in the change log, and refraining from logging a second group of file operations made by other user accounts, other than the user accounts, that lack priority for replications in the change log. That is, it can be that only file operations made by priority users are logged.

In some examples, operation 1004 comprises monitoring, by a filter driver, driver file operations made by a file system driver, wherein respective indications of the driver file operations are stored in the change log. That is, a filter driver similar to filter driver 204 of FIG. 2 can be implemented.

In some examples, operation 1004 comprises receiving, by a file-change daemon, the respective indications of the driver file operations from the filter driver, and writing, by the file-change daemon, the respective indications of the driver file operations to the change log. The file-change daemon can be part of file transfer prioritization during replication component 212 of FIG. 2 and write information to change log 214.

In some examples, the filter driver is a first filter driver, the driver file operations made by the file system driver are first file operations made by a first file system driver, the indications are first indications, operation 1004 comprises monitoring, by a second filter driver, second file operations made by a second file system driver, wherein second indications of the driver file operations are stored in the change log, and wherein the first file system driver and the second file system driver process respectively process the first file operations and the second file operations according to different protocols. That is, there can be examples that utilize multiple filter drivers and one file-change daemon, such as in system architecture 300 of FIG. 3 with filter driver 304A, filter driver 304B, and file transfer prioritization during replication component 312 (which can comprise a file-change daemon).

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of client computer 102 and/or server 106 of FIG. 1.

In some examples, computing environment 1100 can implement one or more embodiments of the process flows of FIGS. 8-10 to facilitate file transfer prioritization during replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining to perform a replication of data from first computing equipment to second computing equipment, the data being stored as part of a path in a file system;
      determining that a change log of file operations on files in the path identifies a file operation on a file that is made by a user account, wherein first user accounts that comprise the user account have a priority for replications relative to second user accounts;
      replicating the file; and
      after processing the change log for file operations made by the first user accounts that have priority for replications, replicating other files in the path associated with the second user accounts that do not have priority for replications.

2. The system of claim 1, wherein the change log identifies the user account, the file operation, and a path of the file.

3. The system of claim 1, wherein the operations further comprise:
   receiving user input data indicative of identifying the user account as having priority.

4. The system of claim 1, wherein the file operation comprises reading the file, modifying the file, or creating the file.

5. The system of claim 1, wherein the operations further comprise:
   after processing the change log for the file operations made by the first user accounts that have priority for replications, truncating the change log.

6. The system of claim 1, wherein the user account is a first user account, wherein the change log comprises a first change log and a second change log, wherein the first change log stores information about first file operations made by the first user account, and wherein the second change log stores information about second file operations made by a second user account.

7. The system of claim 1, wherein replicating the other files in the path comprises:
while traversing the path,
adding first files in the path that are omitted from the change log to a replication queue; and
refraining from adding second files in the path that are referenced in the change log to the replication queue.

8. A method, comprising:
determining, by a system comprising a processor, that a change log of file operations on files in a path for a replication identifies a file operation on a file that is made by a user account that has priority for replications relative to other user accounts that lack priority for replications;
replicating, by the system, the file; and
after processing the change log for file operations, comprising the file operation, made by user accounts, comprising the user account, that have priority for replications, replicating, by the system, other files in the path applicable to the other users accounts that lack priority for replications.

9. The method of claim 8, wherein the file operations made by the user accounts that have priority for replications are first file operations, and further comprising:
logging, by the system, the first file operations made by the user accounts that have priority for replications in the change log; and
refraining, by the system, from logging second file operations made by the other user accounts that lack priority for replications in the change log.

10. The method of claim 8, further comprising:
monitoring, by a filter driver of the system, for driver originated file operations made by a file system driver, wherein indications of the driver originated file operations are stored in the change log.

11. The method of claim 10, further comprising:
receiving, by a file-change daemon of the system, the indications of the driver originated file operations from the filter driver; and
writing, by the file-change daemon, the indications of the driver originated file operations to the change log.

12. The method of claim 10, wherein the filter driver is a first filter driver, wherein the file system driver is a first file system driver, wherein the driver originated file operations are first file operations, wherein the indications are first indications, and further comprising:
monitoring, by a second filter driver of the system, second file operations made by a second file system driver, wherein second indications of the second file operations are stored in the change log, and wherein the first file system driver and the second file system driver process respective file operations according to different protocols.

13. The method of claim 12, further comprising:
receiving, by a file-change daemon of the system, the first indications of the first file operations from the first filter driver and the second indications of the second file operations from the second filter driver; and
writing, by the file-change daemon, the first indications of the first file operations to the change log, and the second indications of the second file operations to the change log.

14. The method of claim 8, wherein the user account is a first user account, wherein the change log comprises a first change log and a second change log, wherein the first change log stores information about first file operations made by the first user account, and wherein the second change log stores information about second file operations made by a second user account.

15. A non-transitory computer-readable medium comprising instructions that, in response to execution, cause a system comprising a processor to perform operations, comprising:
determining that a change log of file operations on files in a path for a replication identifies first files accessed by a user account that has priority for replications relative to another user account;
replicating the first files; and
after replicating the first files, replicating second files in the path, wherein the second files omit files from the first files.

16. The non-transitory computer-readable medium of claim 15, wherein replicating the second files comprises:
concurrently with traversing the path,
adding first ones of the files in the path that are omitted from the change log to a replication queue from which files are replicated; and
refraining from adding second ones of the files in the path that are referenced in the change log to the replication queue.

17. The non-transitory computer-readable medium of claim 15, wherein the operations further comprise:
logging a first group of file operations, comprising the file operations, made by user accounts, comprising the user account, that have priority for replications in the change log; and
refraining from logging a second group of file operations made by other user accounts, comprising the other user account and other than the user accounts, that lack priority for replications in the change log.

18. The non-transitory computer-readable medium of claim 15, wherein the operations further comprise:
monitoring, by a filter driver, driver file operations made by a file system driver, wherein respective indications of the driver file operations are stored in the change log.

19. The non-transitory computer-readable medium of claim 18, wherein the operations further comprise:
receiving, by a file-change daemon, the respective indications of the driver file operations from the filter driver; and
writing, by the file-change daemon, the respective indications of the driver file operations to the change log.

20. The non-transitory computer-readable medium of claim 18, wherein the filter driver is a first filter driver, wherein the driver file operations made by the file system driver are first file operations made by a first file system driver, wherein the indications are first indications, and wherein the operations further comprise:
monitoring, by a second filter driver, second file operations made by a second file system driver, wherein second indications of the driver file operations are stored in the change log, and wherein the first file system driver and the second file system driver process respectively process the first file operations and the second file operations according to different protocols.

* * * * *